Mar. 27, 1923.

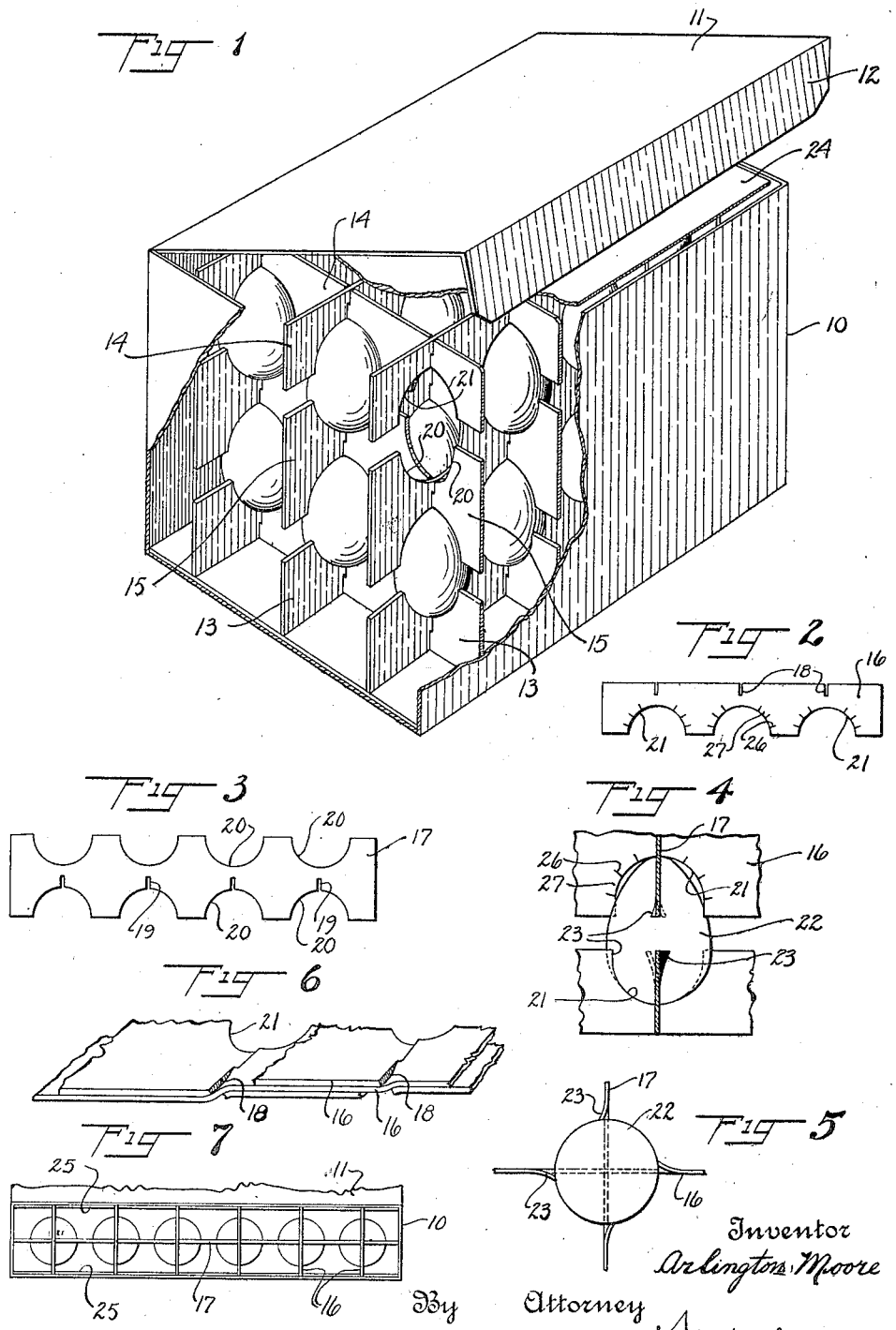

A. MOORE

CRATE

Filed Aug. 29, 1921

1,449,531

2 sheets-sheet 2

Inventor
Arlington Moore
By Attorney H. H. Dyke

Patented Mar. 27, 1923.

1,449,531

UNITED STATES PATENT OFFICE.

ARLINGTON MOORE, OF NEW YORK, N. Y., ASSIGNOR TO MOORE INVENTIONS CORPORATION, OF WORCESTER, MASSACHUSETTS, A CORPORATION OF MASSACHUSETTS.

CRATE.

Application filed August 29, 1921. Serial No. 496,476.

*To all whom it may concern:*

Be it known that I, ARLINGTON MOORE, a citizen of the United States, and a resident of the borough of Manhattan, city, county, and State of New York, have invented a new and useful Improvement in Crates, of which the following is a specification.

My invention relates to crates and has for its principal object to provide a crate and holders therein adapted to hold eggs and other breakable objects, such as bottles, tumblers, electric light bulbs and the like, gently but firmly, thereby preventing breakage by insuring that all shocks and strains transmitted to the article are exerted in the direction of its greatest strength and power of resistance. An object of the invention as applied to the packaging of eggs consists in the supporting of eggs in such manner that practically the entire surface thereof is freely exposed to the air, thereby insuring maximum ventilation, and in that the holders in contact with the eggs are of moisture conducting material and make close contact with the eggs, and are adapted to conduct away any excess moisture, which, together with the provision for maximum ventilation, serves to keep eggs packed in crates embodying my invention fresh over comparatively long periods of time.

These and related objects are attained in a crate embodying my invention by providing same with holders made up of strips of material, such as pasteboard, newsboard, chipboard, or the like, set edgewise, crossing one another and having recesses formed in their edges at the crossing axes, thereby providing seats for the articles to be supported. These seats being formed in the edges of the strips the entire contact made by the holder with ends of the eggs, for example, is confined to four lines or regions extending radially from the center of the seat. With the foregoing and related objects in view, my invention consists in the features of construction and combination herein set forth and claimed.

Figure 8:
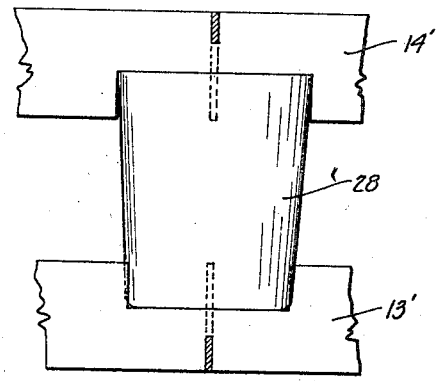
Figure 9:
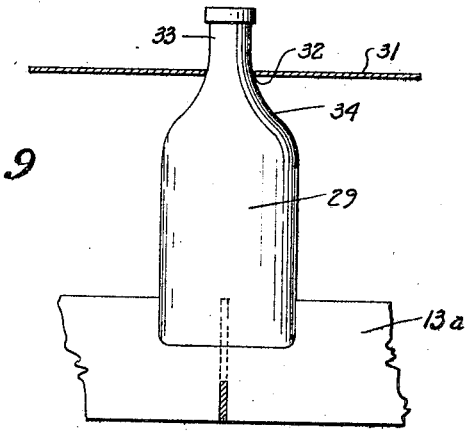
Figure 10:
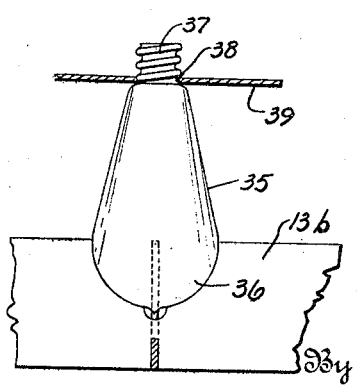

In the accompanying drawings, Fig. 1 is a perspective view with parts broken away of an egg crate with eggs in place therein, and adapted for shipment as by parcel post or otherwise. Fig. 2 is a side view of a notched and recessed strip forming one of the elements of a top or bottom holder. Fig. 3 is a view similar to Fig. 2 but showing one of the strip elements of an intermediate or separating holder. Fig. 4 is an enlarged fragmentary detail part sectional view showing how an egg is held in the holders. Fig. 5 is a detail view taken at right angles to Fig. 4, and also serving to show the manner in which the egg is held. Fig. 6 is a perspective view with parts broken away and showing a holder collapsed as for shipment or storage, Fig. 7 is a top view of a crate for a single row of eggs, more especially adapted for use in retail packages containing a small number of eggs. Fig. 8 is a sectional view of the holders of my invention applied to holding tumblers by both ends, Fig. 9 is a similar view showing the bottoms of bottles held in such holder, and Fig. 10 is a view similar to Fig. 9 and showing the invention applied to holding the outer ends of electric light bulbs.

The application of the invention to egg crates will be first described:

Reference character 10 designates the container which may be a box, carton, or the like, and is conveniently referred to as a crate.

The crate 10 may have lids of various forms. A folding lid 11 with a fastening flap 12 is illustrated in Fig. 1. Bottom and top egg holders 13 and 14 are shown, and a single separating holder 15, but it is obvious that more than one separating holder may be used, if desired, or the end holders may be used without any intermediate separating holders. The separating holders 15 are constructed like the top and bottom holders 13 and 14, except that they are double, that is to say, they have egg holding seats in both top and bottom faces, instead of in one face only.

The holders are made up of strips 16, 17 crossing one another preferably at right angles. These strips are provided at their crossing points or axes with notches 18, 19 formed half in each strip, so as to permit the strips to be readily put together to make up the holders and also to permit the collapsing of the holders as shown in Fig. 6, thereby providing for a convenient storage or shipment of the holders when required. The strips when put together stand edgewise and with the notches engaging one another form substantially a lattice work with the strips at right angles to one another.

Seats are provided in such holders for receiving and holding the eggs by their ends, and these seats are made by forming recesses 20, 21 in the edges of each of the strips at their crossing points or axes. The notches 18, 19 thus are located midway between the sides of recesses 20, 21. The seats thus provided may be described as substantially cruciform, since same are made up of the edges of the strips extending radially in four lines or regions away from the center of the seat; and the end of the egg is held therein in a manner somewhat similar to a pearl or round stone in a jewelry setting.

Strips 16, 17 are preferably of material such as paste-board, newsboard or chipboard, which is adapted to support the eggs, but can yield more or less when subjected to moderate pressure applied to the egg held in the seat. The seats are preferably made smaller in one or more dimensions than the corresponding dimension of the eggs to be held therein, so that when the egg is put in place the material of the strips adjacent to the seats can yield somewhat and conform to the contour of the egg. In this way eggs of various sizes may be firmly held and substantially no movement of the eggs in their seats is permitted and breakage of the eggs is prevented. In the form shown, the transverse dimension of the rounded recesses making up the seats is made somewhat undersized as compared with the egg, as shown clearly in Fig. 4, so that when the egg 22 is put into place these edges or corners 23 may yield and be displaced, for example, as shown in Fig. 5, though the compression, instead of being entirely lateral, may take place more or less in the edgewise direction of the strips, as will be understood. The material of the strips is sufficiently elastic so that its tendency to return to normal position results in the egg being held firmly and prevented from rattling around or getting out of place, and this feature of the device also permits use with eggs of various sizes, although preferably as is customary the eggs packed in a single crate are subjected to preliminary sorting for size, whereby the eggs in each crate are obtained of substantially uniform size.

To pack a crate such as shown in Fig. 1, the bottom holder 13, if collapsed, is straightened out, so that the strips thereof are at right angles to one another, and the bottom holder is put into place in the bottom of the box with the recessed side upwards, then the eggs are set in place on end in the seats, preferably with the larger ends down. The seats are preferably spaced a sufficient distance apart so that there is no lateral contact between adjacent eggs. Next the separator holder 15 is put in place, then another layer of eggs and finally the top holder 14 with the recessed side down. If desired, a sheet of cardboard or the like 24 may be placed on top of the upper holder and the crate is then securely closed. The act of closing the crate serves to compress its contents to the extent that the top holder 15 projects beyond the top of the crate when the eggs are in place. When the package is completed in the manner described it will be seen that the eggs are held firmly by pressure applied to their opposite ends, that the eggs are held apart and prevented from coming into lateral contact with one another, and that when so packed the crates may be subjected to rough usage without danger of breaking the eggs; that practically the entire surface of the eggs is exposed to the air so that maximum ventilation is afforded; and that the edges of strips 16, 17, which are of moisture absorbing material, coming into firm contact with the egg, may serve as wicks to conduct away any excess moisture and serving, along with the free ventilation obtained, to keep the eggs fresh over long intervals.

When the eggs are arranged in a single row as in the small carton shown in Fig. 7, strips 25 may be provided along one or both sides of the holders and serve to keep the same at right angles to one another.

If desired, one or more shallow cuts or kerfs may be formed in the material of the strips at the side or sides of the recesses formed therein, as shown at 26, Fig. 2, giving an increased readiness and latitude of deformation to egg contour and better adapting the holders for use with eggs of varying sizes. The portions 27 between these kerfs or cuts may even be turned out at substantially a right angle to the plane of the strip and form substantially a flange when an unusually large egg is inserted in the seat.

The holders of the present invention may be applied to both ends of the crated articles, and this arrangement is preferably resorted to in the case of packages for eggs, tumblers and the like, but the invention may be utilized in connection with various other breakable articles, such as bottles, incandescent lamps and the like, for affording a support for one of the ends of such articles in conjunction with a holder or holders of other types for the opposite ends of such articles, as the neck of a bottle, the socket end of an electric light bulb or the like. The present invention embraces the use of such holder where applied to one or both ends of the packaged article. In Fig. 8 I have shown how glass tumblers 28 may be held by their opposite ends between the holders 13', 14' of the present invention, and in Fig. 9 I have shown how glass bottles 29, which may or may not be filled bottles, may have their bases 30 held in a holder 13ª made of crossed strips recessed at their crossings, while the necks 31 of the bottles are otherwise held, the holder illustrated herein consisting of a board 31 with holes 32 therein through which the necks 33 of the bottles are passed with the shoulder 34 of the bottle against the side thereof.

In Fig. 10 electric bulbs 35 are illustrated, with their outer ends 36 held in holders 13ᵇ according to the present invention, and their socket ends 37 screwed in openings 38 in the sheet of strawboard or the like 39. The claims of the present case cover such holder made of crossed and recessed strips broadly, and whether applied to one or both ends of the article, and also cover the application of such holders to both ends of articles such as eggs, tumblers and the like. The combination of such holders applied to one end of the device with a different type of holder for the opposite ends thereof, such as shown in Figs. 9 and 10, for example, is claimed in my application Serial No. 496,475 filed on even date herewith.

It is to be understood that the forms shown are for illustration only and are not to impose limitations upon the invention, and that modifications and changes may be made, within the scope of my claims, without departing from the principle of my invention.

I claim:

1. A holder for breakable articles comprising a lattice work of strips set edgewise and having seats for the end of such articles at the strip intersections.

2. In a crate for breakable articles, a plurality of crossed strips provided at their crossings with intersecting recessed portions forming a seat for the end of the articles.

3. In a crate for breakable articles, means including crossed strips set edgewise and having recesses therein at their crossings for holding such articles in place by their opposite ends.

4. In a crate for breakable articles, a holder for such articles comprising members crossing one another and having seats therein formed by recessing each of the crossing members at the crossing axis.

5. In an egg crate, a plurality of crossed strips having notches in each for passage of the other and provided at their crossings with intersecting recessed portions forming a seat for the end of an egg.

6. In an egg crate, notched strips crossing one another at right angles and recessed at the crossings to form seats for the ends of eggs, said seats being spaced apart to keep adjacent eggs out of contact with one another.

7. In an egg crate, strips having recesses formed in their edges and having notches for passage of one another, said notches being located opposite the middle of the recesses, and the strips set edgewise and crossing one another at the notched places.

8. In an egg crate, an egg end holder comprising notched strips set edgewise and crossing at the notches and provided with egg end seats formed in the edges of the strips and centered at the crossing axis.

9. In an egg crate, strips having rounded recesses in their edges and notched out and crossing one another at substantially the middle of the recesses and forming an egg support provided with substantially cruciform seats for reception and support of eggs by their ends.

10. In an egg crate, crossed strips of material adapted to support an egg but to give somewhat in contact therewith, and seats formed in the edges of the strips at crossing points, said seats being normally smaller than the end of the egg, but adapted to yield and to conform to the shape of the egg under moderate pressure.

11. In an egg crate, a plurality of strips of material such as newsboard or chipboard notched out to cross one another and provided with rounded recesses intersecting at the crossing axis, said recesses forming a seat for the end of an egg, but of somewhat different contour therefrom, and the material of the strips being adapted to yield somewhat to adapt the seat to the contour of the egg.

12. In an egg crate, strips set edgewise and notched out and crossing one another, said strips having recesses in their edges extending substantially an equal distance to each side of the crossing notches, whereby substantially cruciform seats are provided for receiving and holding eggs by their ends, and adapted to contact with the egg along four radial lines.

13. In an egg crate, an end support for eggs comprising recessed strips set edgewise and crossing one another and providing seats for the eggs made up of the recessed edges of the strips contacting with the ends of the eggs along four lines extending radially from the seat center.

14. A separator for egg crates comprising strips notched out and crossing one another and provided at their crossings with centrally intersecting recesses in both their upper and lower edges, whereby cruciform seats are provided for ends of eggs on both sides of the separator.

15. In an egg crate, a collapsible egg holder or separator comprising strips notched together set edgewise and crossing one another and provided with recesses at their crossing points and collapsible to lie substantially flat when out of use.

16. In an egg crate, reversely faced holders for the tops and bottoms of eggs comprising notched strips set edgewise and crossing at the notches and provided with egg end seats formed in the edges of the strips and having their centers at the crossing axis.

17. In an egg crate comprising a container and a lid, means for holding eggs in place by their opposite ends, said means extending beyond the lid end of the container somewhat when the eggs are in place and being adapted to be compressed upon the eggs by closing the lid.

18. A package for eggs comprising a container and its lid, a bottom holder in the container having spaced seats for ends of eggs held out of contact with one another, and a similar holder in the container set upside down on the opposite end of the eggs.

19. In an egg crate, separated supports for the opposite ends of eggs comprising strips set edgewise and crossing one another at substantially equidistant intervals at substantially a right angle and notched out for passage of one another at the crossings, said strips being provided with recesses at their crossings, which recesses extend substantially an equal distance to each side of the crossing, whereby seats are provided for the ends of eggs which seats are made up of the recessed edges of the strips, and adapted to support the egg along four lines or regions extending radially from the crossing axis.

20. In an egg crate, a container, a bottom egg support therein comprising notched strips set edgewise and crossing at the notches and provided with seats formed in the upper edges of the strips at their crossings for supporting eggs by their ends, and a top support or holder for the opposite ends of the eggs similar to the bottom holder but in relatively reversed position.

21. In an egg crate, a container, a bottom egg support therein comprising notched strips set edgewise and crossing at the notches and provided with seats formed in the upper edges of the strips at their crossings for supporting eggs by their ends, and a top support or holder for the opposite ends of the eggs similar to the bottom holder but in relatively reversed position, said top support or holder normally extending somewhat above the top of the container when eggs are in place, and a lid for the container, whereby when the lid is closed the holder is pressed in and the eggs are firmly held.

22. In an egg crate, a container, a bottom egg support therein comprising notched strips of material adapted to support the eggs but adapted to yield somewhat in contact therewith, said strips being set edgewise and crossing at the notches and provided with seats formed in the upper edges of the strips at their crossings for supporting eggs by their ends, said seats having a transverse dimension smaller than the corresponding dimension of eggs to be placed therein, whereby the parts of the strips forming the seats may yield somewhat under pressure to conform to the contour of the eggs.

23. In an egg crate, a container, a bottom holder having flexible four edged seats for egg ends, said seats being located at a distance apart to keep the eggs out of contact, a top holder like the bottom holder reversed, and a separator having like seats on its top and bottom, said holders and separators being held at a substantial distance apart by the eggs when in place therebetween.

24. A ventilating crate for eggs comprising holder strips adapted to contact with the eggs along the edges of the strips only.

25. A ventilating and moisture withdrawing crate for eggs comprising holder strips of moisture conducting material at the opposite ends of the eggs, said strips having egg seats in their edges and the contact with said seats in the edges of the strips forming the sole support for eggs in the crate.

26. In a holder for egg crates, strips set edgewise and crossing one another, said strips being recessed at the crossings to form seats for egg ends, and a kerf formed in the recessed strip material.

27. In a holder for egg crates, a lattice work of strips set edgewise and crossing one another and provided with rounded recesses intersecting at the crossings to provide seats for egg ends, and a plurality of kerfs formed in the strip material at each side of the recesses therein.

In testimony that I claim the foregoing, I have signed my name hereto.

ARLINGTON MOORE.